US012094301B2

(12) United States Patent
D'Andrea

(10) Patent No.: US 12,094,301 B2
(45) Date of Patent: *Sep. 17, 2024

(54) VIDEO ANALYSIS FOR VISUAL INDICATOR OF MARKET SUSPENSION

(71) Applicant: AdrenalineIP, Washington, DC (US)

(72) Inventor: Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,775

(22) Filed: Aug. 12, 2022

(65) Prior Publication Data

US 2022/0392310 A1 Dec. 8, 2022

Related U.S. Application Data

(63) Continuation of application No. 17/336,762, filed on Jun. 2, 2021, now Pat. No. 11,417,175.

(60) Provisional application No. 63/119,821, filed on Dec. 1, 2020.

(51) Int. Cl.
*G07F 17/32* (2006.01)
*G06Q 50/34* (2012.01)

(52) U.S. Cl.
CPC ......... *G07F 17/3269* (2013.01); *G06Q 50/34* (2013.01); *G07F 17/3288* (2013.01)

(58) Field of Classification Search
CPC .. G07F 17/3269; G07F 17/3288; G06Q 50/34
See application file for complete search history.

(56) References Cited

U.S. PATENT DOCUMENTS 9,094,576 B1 * 7/2015 Karakotsios ............ G10L 15/02
2015/0148129 A1 5/2015 Austerlade et al.
2015/0279164 A1 10/2015 Miller et al.
2016/0300425 A1 10/2016 Devaraj et al.
2017/0168653 A1 * 6/2017 Spiess .................. G06F 40/197
2020/0126363 A1 4/2020 Trepp et al.

* cited by examiner

*Primary Examiner* — James S. McClellan
*Assistant Examiner* — Ross A Williams
(74) *Attorney, Agent, or Firm* — Maier & Maier, PLLC

(57) ABSTRACT

A system for suspending a micro-market through a visual indicator, such as the offense breaking the huddle or the referee removing his hand from the ball after the spot when the offensive line is at the line of scrimmage waiting to run the play.

6 Claims, 4 Drawing Sheets

Figure 1:
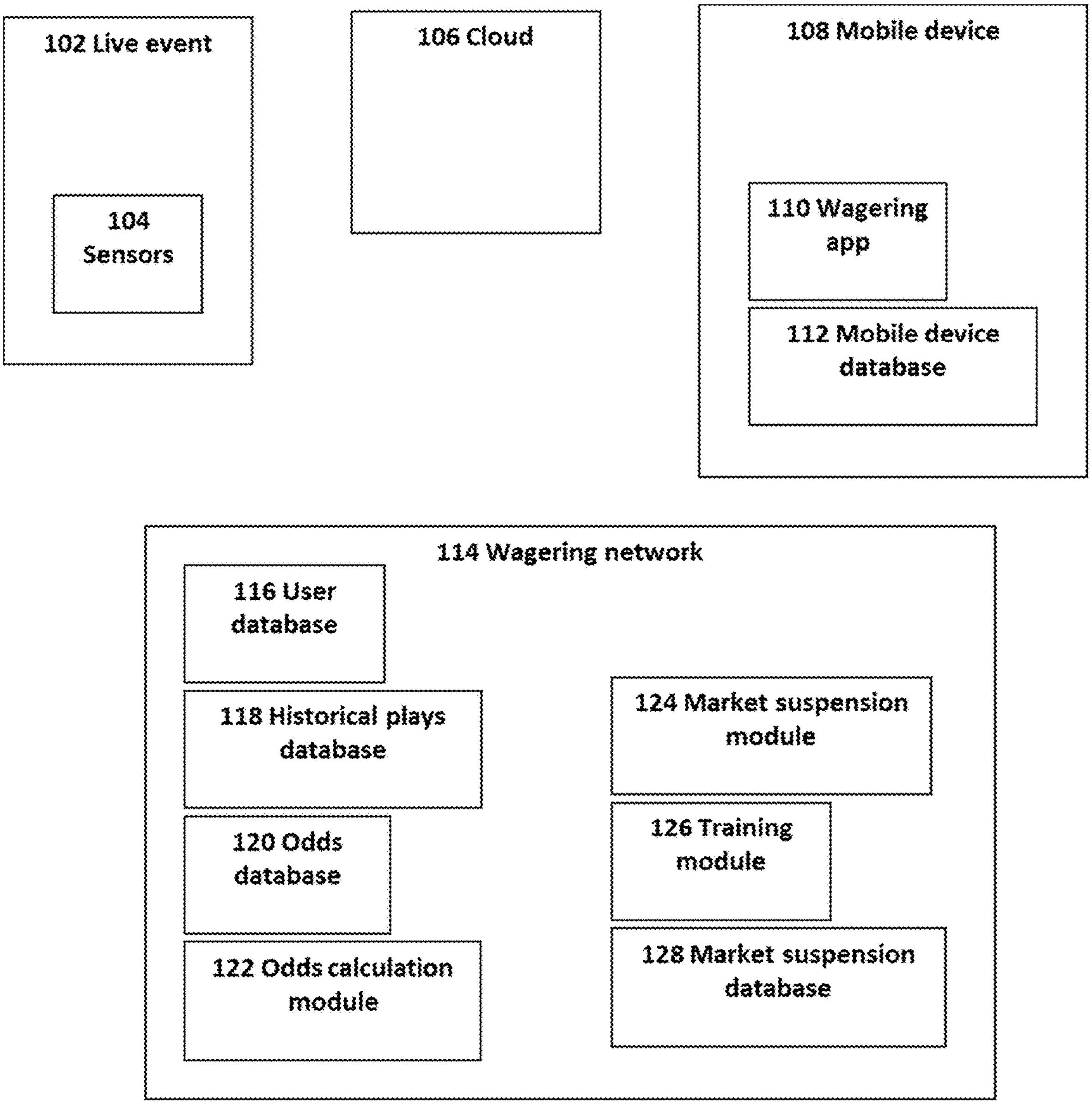

| Live Event Type | Sensor(s) | Market Suspension Indicator | Accuracy | Description |
|---|---|---|---|---|
| Baseball | #30 | Movement | 10 | Identified by detected movement from the pitcher's mound sensor data |
| Baseball | #30 | Detect Object: Human | 20 | Identified by a detected human from the pitcher's mound sensor data |
| Baseball | #30 | Detect Face: Sheduled Pitcher | 40 | Identified by facial recognition of the next pitcher on the roster from the pitcher mound sensor data. |
| Baseball | #8 | Detect Face: Sheduled Batter | 40 | Identified by facial recognition of the next batter on the roster from the home plate sensor data. |
| American Football | #14, #22, #4A | Detect Objects: Human (15) | 18 | Identified by 15 or more detected humans from the sensor data from one or more of the yardline cameras |
| - | - | - | - | - |
| - | - | - | - | - |

Fig. 4

VIDEO ANALYSIS FOR VISUAL INDICATOR OF MARKET SUSPENSION

FIELD

The embodiments are generally related to play by play wagering on live sporting events.

BACKGROUND

Single-play betting or micro-betting is the practice of wagering on the outcome of a small event, such as a play, within a large event, such as a game of baseball. Accordingly, the amount of time bettors can place a wager is small.

Closing the betting window too late can cause the offeror of the bet to take losses because the outcome of the play is already decided or close to decided by the time wagers stop being placed. On the other hand, closing the wagering window too early can cause loss of revenue due to bettors being excluded and may also cause bettors who feel rushed to be frustrated.

One solution to these problems is to manually close the betting window when a play is about to begin or has begun. However, this solution has its own set of issues. It may increase labor costs to hire people to make these manual decisions, and it may invite human error into the system.

SUMMARY

A method and system for controlling and enabling access to a wagering network and available wagers. In one embodiment, a method of suspending a wager market in a play-by-play sports betting application is provided. The method can include providing a wager market in a sport betting application; receiving and storing one or more wagers in a database, the wagers having been placed on an action in a live sporting event; receiving and storing data collected by at least one sensor associated with the live sporting event; interpreting the data collected by the at least one sensor to determine a next play will begin; and suspending the wager market from receiving wagers based on the interpreted data collected by the at least one sensor.

In another embodiment, a system for controlling availability of wagering on a sports betting application may be provided. The system can include a live sporting event; one or more sensors configured to collect and transmit data associated with the live sporting event; a sports betting application configured to receive and place wagers; a market suspension module configured to control the availability of the sports betting application to receive and place wagers; and one or more market suspension indicators based on the data collected by the one or more sensors, where the determination that at least one market suspension indicator has been detected prompts the market suspension module to suspend the receipt and placement of wagers in the sports betting application.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for suspending a micro-market through a visual indicator, according to an embodiment.

Figure 2:
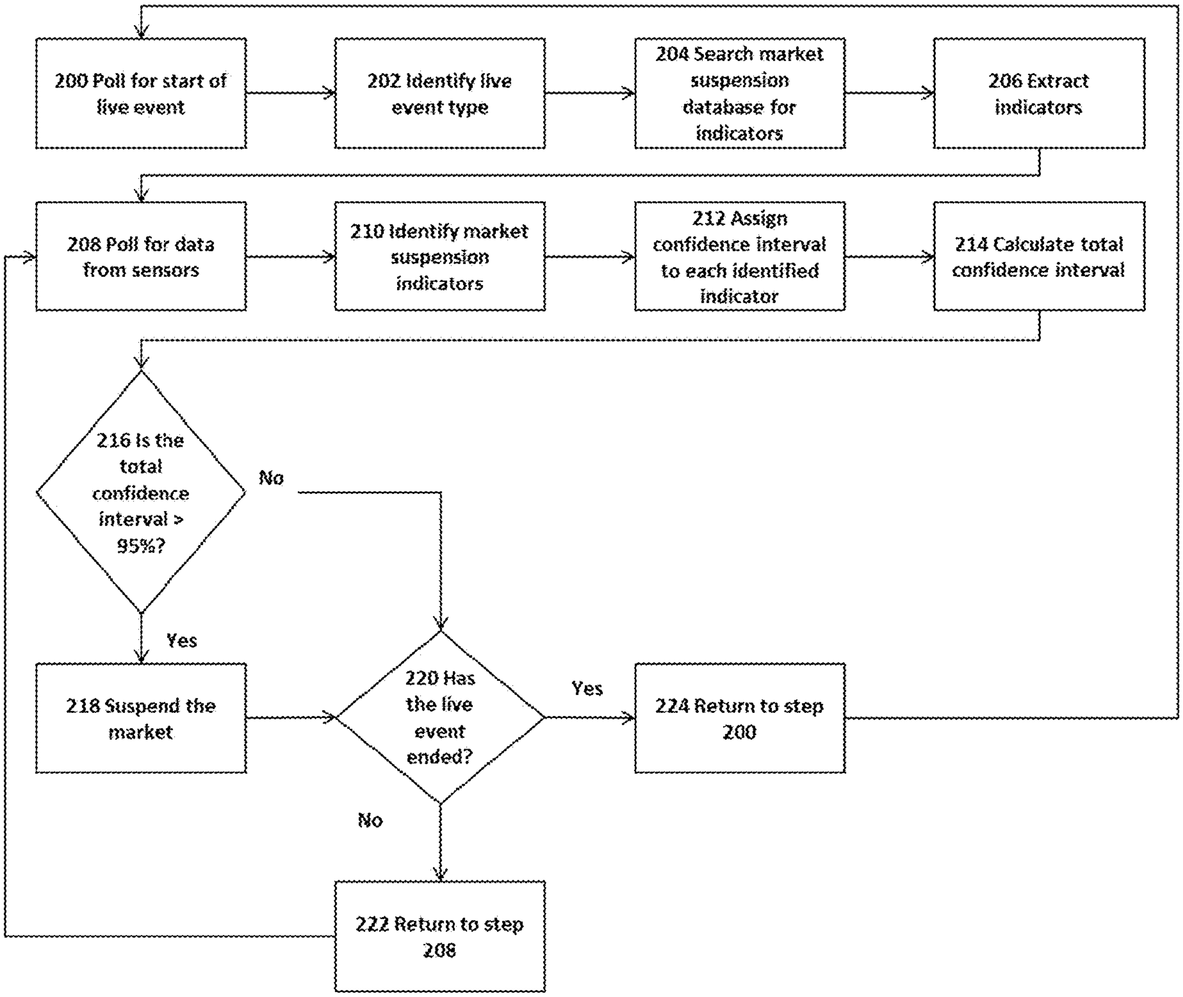

FIG. 2: illustrates a market suspension module, according to an embodiment.

Figure 3:
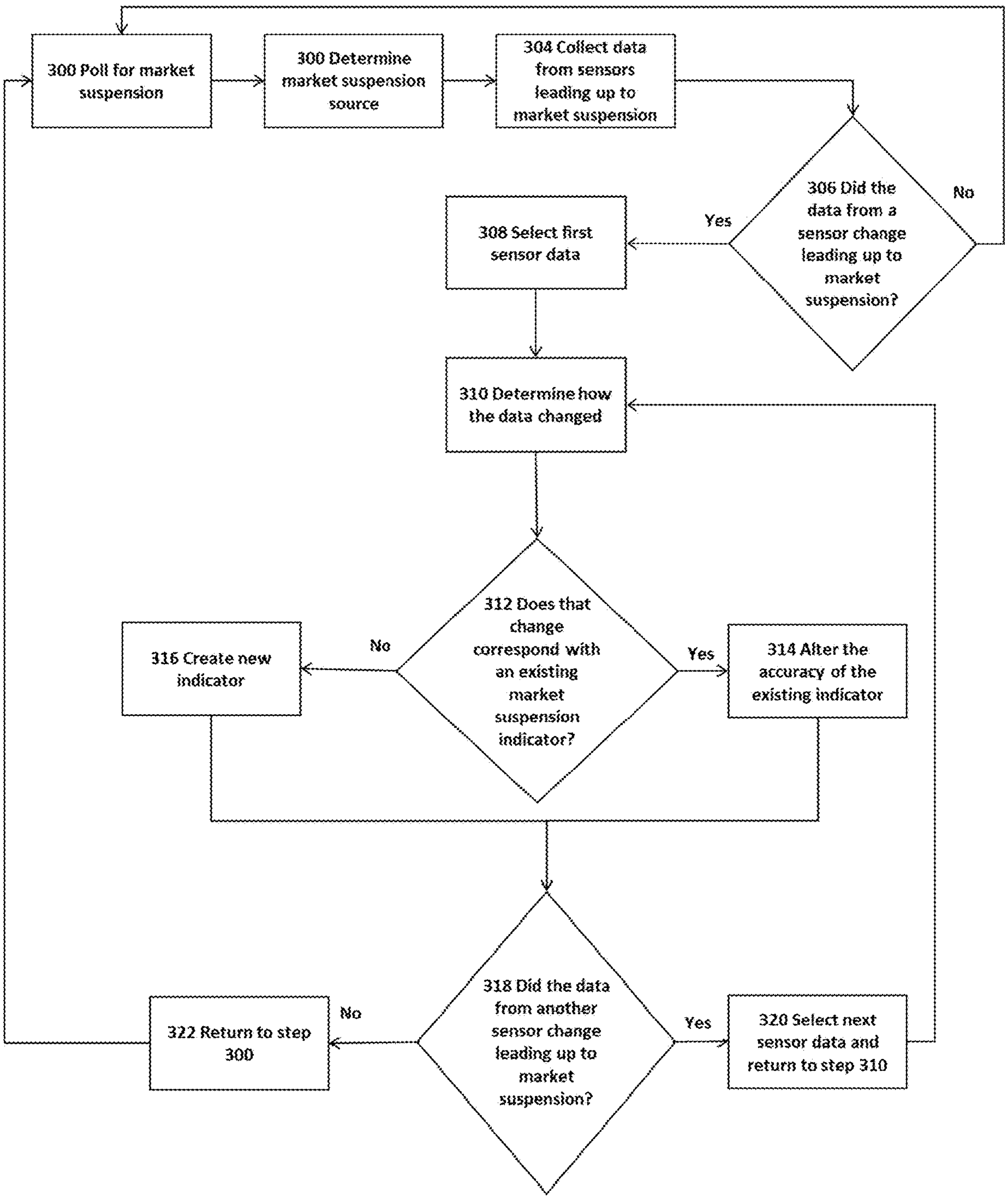

FIG. 3: illustrates a training module according to an embodiment.

FIG. 4: illustrates a market suspension database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means.

State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

“Fantasy sports connector” are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a “fumble” could be recognized and at the time stamp of the event, metadata such as “fumble” could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user’s view of the real world, thus providing a composite view. In an example of this invention, a real time view of the game can be seen and a “bet” which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms “a,” “an,” and “the” include plural references unless the context clearly dictates otherwise. Although any systems and methods similar or equivalent to those described herein can be used in the practice or testing of embodiments, only some exemplary systems and methods are now described.

FIG. 1 is a system for suspending a micro-market through a visual indicator. This system may include a live event 102, for example, a sporting event such as a football game, basketball game, baseball game, hockey game, tennis match, golf tournament, eSports or digital game, etc. The live event 102 may include some number of actions or plays, upon with a user or bettor or customer can place a bet or wager, typically through an entity called a sportsbook. There are numerous types of wagers the bettor can make, including, but not limited to, a straight bet, a money line bet, a bet with a point spread or line that the bettor’s team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk. This is typically applied to round-robin or other tournaments’ styles. There are other types of wagers, including parlays, teasers, and prop bets, that are added games that often allow the user to customize their betting by changing the odds and payouts they receive on a wager. Certain sportsbooks will allow the bettor to buy points, to move the point spread off of the opening line. This will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have several bets they can handle, a limit of wagers they can take on either side of a bet before they will move the line or odds off of the opening line. Additionally there are circumstances, such as an injury to an important player such as a listed pitcher, in which a sportsbook, casino, or racino will take an available wager off the board. As the line moves, there becomes an opportunity for a bettor to bet on both sides at different point spreads to middle and win both bets. Sportsbooks will often offer bets on portions of games, such as first-half bets and half-time bets. Additionally, the sportsbook can offer futures bets on live events in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, optical sensors and cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices, etc. Also, the plurality of sensors 104 may include tracking devices, such as RFID tags, GPS chips, or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques that are known in the art. The communication network may allow ubiquitous access to shared pools of configurable system resources and higher-level services that can be rapidly provisioned with minimal management effort, often over the Internet, and relies on sharing of resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data, such as the time of the game, the score, location on the field, weather conditions, and the like, which may affect the choice of play utilized. For example, in some exemplary embodiments, the cloud 106 may not receive data gathered from the sensors 104 and may, instead, receive data from an alternative data feed, such as Sports Radar®. This data may be compiled substantially immediately following the completion of any play, and the data from this feed may be compared with a variety of team data and league data based on a variety of elements, including down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide for voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control the I/O devices. The I/O controller may control one or more I/O devices, such as, e.g., a keyboard and a pointing device, e.g., a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, an Ethernet bus, a Gigabit Ethernet bus, a Fiber Channel bus, or a Thunderbolt bus. In other embodiments, the mobile device 108 could be an optional component and would be utilized in a situation where a paired wearable device utilizes the mobile device 108 as additional memory or computing power or connection to the internet.

Further, embodiments may include a wagering software application or a wagering app 110, which is a program that enables the user to place bets on individual plays in the live event 102 and display the audio and video from the live event 102, along with the available wagers on the mobile device 108. The wagering app 110 allows the user to interact with the wagering network 114 to place bets and provide payment/receive funds based on wager outcomes.

Further, embodiments may include a mobile device database 112 that may store some or all of the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in other exemplary embodiments, the wagering network 114 may not receive data gathered from the sensors 104 and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network 114 can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a user database 116, which may contain data relevant to all users of the wagering network 114, which may include a user ID, a device identifier, a paired device identifier, wagering history, and wallet information for the user. The user database 116 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 116 may contain betting lines and search queries. The user database 116 may be searched based on a search criterion received from the user. Each betting line may include a plurality of betting attributes such as at least one of the live event 102, a team, a player, an amount of wager, etc. The user database 116 may include information related to all the users involved in the live event 102. In an exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data should include metadata about the historical plays, such as time, location, weather, previous plays, opponent, physiological data, etc.

Further, embodiments may utilize an odds database 120 that contains the odds calculated by an odds calculation module 122 to display the odds on the user's mobile device 108 and to take bets from the user through the mobile device wagering app 110.

Further, embodiments may include the odds calculation module 122, which utilizes historical play data to calculate odds for in-play wagers Further, embodiments may include a market suspension module 124, which may examine the video of the live event 102 to identify market suspension indicators. The market suspension module 124 may suspend the market by preventing further wagers from being placed. The market suspension module 124 may suspend the market after reaching a threshold confidence interval that the market should be suspended based on the identified market suspension indicators.

Further, embodiments may include a training module 126, which may poll for when the market has been suspended and determine which sets of data coming from the sensors 104 may be market suspension indicators.

Further, embodiments may include a market suspension database 128, which may store all of the market suspension indicators used by the market suspension module 124 to identify a market suspension condition in the live event 102, such as the offense breaking the huddle in an NFL game, or the pitcher stepping on the rubber in an MLB game. The market suspension database 128 may also contain an evaluation of the accuracy of each indicator from the training module 126.

FIG. 2 illustrates the market suspension module 124. The process may begin with the market suspension module 124 polling, at step 200, for the start of the live event 102. The market suspension module 124 may identify, at step 202, the type of live event 102. For example, an American football game, a baseball game, a horse race, etc. The market suspension module 124 may search, at step 204, the market suspension database 128 for market suspension indicators that are relevant to the type of live event 102. The market suspension module 124 may extract, at step 206, the market suspension indicators from the market suspension database 128. The market suspension module 124 may poll, at step 208, for data from the sensors 104 of the live event 102. This may include video data and other types of data such as pressure sensor data. The market suspension module 124 may identify, at step 210, market suspension indicators in the data from the sensors 104. Market indicators may be any data or change in data from the sensors 104 that indicates that play of the live event 102 is commencing. Therefore, the betting market needs to be suspended to ensure that wagers are not still accepted by the system for the outcome of a play that has already been decided. An example of a market suspension indicator may be movement detected at sensor #30, which is a camera pointed at the pitcher's mound of a baseball game. The market suspension module 124 may use image recognition techniques to identify objects or persons relevant to the market suspension indicators. For example, one market suspension indicator may be that a human appears in sensor #30, which is a camera pointed at the pitcher's mound of a baseball game. The market suspension module may use facial recognition to identify players relevant to the market suspension indicators. For example, one market suspension indicator may be that one of the pitchers of the pitching team appears in sensor #30, which is a camera pointed at the pitcher's mound of a baseball game. The market suspension module 124 may assign, at step 212, a confidence interval to each identified market suspension indicator. The confidence interval may reflect the likelihood that the identification of the market suspension indicator is correct. For example, the market suspension indicator is that a human appears in sensor #30, which is a camera pointed at the pitcher's mound of a baseball game. The market suspension module 124 identifies an object in sensor #30, but the object has only begun to enter the sensor's field of view. Based on the current amount of data available from the sensors, the market suspension module 124 determines a 25% chance this object is a human. Therefore, the confidence interval is 25%. The market suspension module 124 may calculate, at step 214, the total confidence interval for all identified market suspension indicators. The total confidence interval may combine the confidence interval from each identified market indicator and give greater weight to the market suspension indicators that more accurately predict the commencement of the next play. For example, one market suspension indicator may be that a human appears in sensor #30, which is a camera pointed at the pitcher's mound of a baseball game. A second market suspension indicator may be that one of the pitchers of the pitching team appears in sensor #30, which is a camera pointed at the pitcher's mound of a baseball game. The market suspension module 124 assigns a confidence interval to these market suspension indicators of 95% and 80%, respectively. In other words, there is a 95% chance that a human appears in sensor #30, but only 80% that the human that appears is the pitcher for the pitching team. The accuracy of the market suspension indicators are 20 and 40, respectively; these accuracy values are stored in the market suspension database 128 and are determined and adjusted by the training module 126. The second market suspension indicator is assigned a higher accuracy because the pitcher appears near the pitcher's mound and is more likely to indicate the commencement of the next play than any human appearing near the pitcher's mound. The total confidence interval may then be calculated by a weighted average, resulting in a total confidence interval of 85%. Indicators that are not identified may be included as 0% confidence interval and reduce the total confidence interval if they are absent. Indicators may have a negative accuracy which may mean that they indicate that the play is not about to commence, for example, players moving off the field or non-players moving onto the field. The market suspension module 124 may determine, at step 216, if the total confidence interval is above 95%. The confidence interval threshold may be a value different than 95%. The confidence interval threshold may be set by an administrator of the system or another module and may be static or dynamic. If the total confidence interval is not above 95%, the market suspension module 124 may skip to step 220. If the total confidence interval is above 95%, the market suspension module 124 may suspend, at step 218, the wagering market. The market may be suspended until the end of the current play when the market for wagering on the next play opens. The market may be reopened for the current play if the confidence interval falls below a threshold value. The market suspension module 124 may determine, at step 220, if the live event 102 has ended. If the live event 102 has not ended, the market suspension module 124 may return, at step 222, to step 208. If the live event 102 has ended, the market suspension module 124 may return, at step 224, to step 200.

FIG. 3 illustrates the training module 126. The process may begin with the training module 126 polling, at step 300, for market suspension. The training module 126 may determine, at step 302, what caused the market to be suspended. For example, the market may be suspended by the market suspension module 124, by a pre-set betting window, by another module, or manually by an administrator. The source of the market suspension may affect the accuracy of the market suspension indicators. For example, when the market is suspended manually by an administrator, the training module 126 may assign a higher accuracy value to any concurrent indicators than it would if a pre-set betting window suspended the market. This is because the administrator may be a more trustworthy authority than a pre-set betting window. The training module 126 may collect, at step 304, data from the sensors 104 leading up to the market suspension. Leading up may mean an amount of time before the suspension of the market, for example, thirty seconds. This leading-up time may be set by an administrator or another module and may be static or dynamic. The leading-up time may be different for each of the sensors 104. The training module 126 may determine, at step 306, if the data from at least one of the sensors 104 changed in the time leading up to the market suspension. For example, the data from a sensor may have changed from relatively static to dynamic, indicating movement. The training module 126 may use object detection software to determine if the change in data is indicative of the presence or absence of objects such as a baseball, a person, a flag, a foot or shoe, etc. For example, leading up to market suspension sensor may change from detecting no objects to detecting a person. This person may be a pitcher approaching the pitcher's mound. Small changes in data, such as a few pixels difference from frame to frame, may be ignored. If no data from any of the sensors 104 changed, the training module 126 may return to step 300. If the data from at least one of the sensors 104 changed when leading up to the market suspension, the training module 126 may select, at step 308, data from the first of the sensors 104 that changed leading up to the market suspension. First may mean the first sensor that changed based on time, the first sensor based on how sensors 104 are identified, a sensor selected randomly, etc. The training module 126 may determine, at step 310, how the data from the selected sensor changed leading up to the market suspension. For example, sensor #30 is a camera pointed a the pitcher's mound in a baseball game. Leading up to the market suspension, the pitcher walked to the pitcher's mound and into view of sensor #30. At the beginning of the time leading up to the market suspension, data from camera #30 was mostly static. Ten seconds before the market suspension, the movement was detected in the data from sensor #30. At eight seconds before the market suspension, a person was detected by image recognition software in the data from sensor #30. At seven seconds before the market suspension, the pitcher was identified by facial recognition software in the data from sensor #30. Each of these events, movement detected, person detected, or identified, may be determined to be changes leading up to the market suspension. The training module 126 may search, at step 312, the market suspension database 128 for market suspension indicators that correspond with the changes detected. For example, if the movement was detected in sensor #30 leading up to market suspension in a baseball game, the training module 126 will search the suspension database for an entry that includes sensor #30, a change from no movement to movement, and baseball as the live event 102. If there is already an existing market suspension indicator that corresponds to the change in data from the selected sensor, the training module 126 may alter, at step 314, the accuracy of the existing indicator in the market suspension database 128. For example, a movement was detected in sensor #30, leading to a market suspension in a baseball game. The accuracy of the existing entry for movement on sensor #30 in a baseball game may be increased. Therefore, changes in data that often happen before market suspension may increase accuracy faster than changes that happen less often. The training module 126 may decrease accuracy each time an indicator is not identified before a market suspension. The training module 126 may decrease accuracy when each time the opposite change occurs before a market suspension. For example, a movement was detected in sensor #30 at the beginning of the lead-up time to market suspension, and during that time, the movement stopped. The training module 126 may then decrease the accuracy for the existing entry of movement on sensor #30 in a baseball game. If there is no existing market suspension indicator that corresponds to the change in data from the selected sensor, the training module 126 may, at step 316, create an entry in the market suspension database 128 that corresponds to the detected change. For example, a movement was detected in sensor #30, leading to a market suspension in a baseball game. The training module 126 will create an entry that includes sensor #30, a change from no movement to movement, and baseball as the live event 102. The training module 126 may determine, at step 318, if the data from another sensor also changed leading up to the market suspension. If the data from another sensor also changed leading up to the market suspension, the training module 126 may select, at step 320, the next sensor and return to step 310. If no data from any other sensor changed leading up to the market suspension, the training module 126 may return, at step 322, to step 300.

FIG. 4 illustrates the market suspension database 128. The market suspension database 128 may contain a live event type, for example, baseball. The market suspension database 128 may contain one or more of the sensors 104 relevant to identifying a market suspension indicator, for example, sensor #30. The market suspension database 128 may contain a market suspension indicator that indicates the circumstances that influence market suspension, for example, detected movement. The market suspension database 128 may contain an accuracy rating, for example, 10, which is used by the market suspension module 124 to determine which market suspension indicators are more important to the final determination of whether to suspend the wagering market. This accuracy rating is generated and adjusted over time by the training module 126. Market suspension indicators that always or often coincide with the suspension of the market have their accuracy increased over time to high accuracy. Indicators with high accuracy may be able to cause the suspension of the market without other indicators if the indicator has a high enough confidence interval. Market suspension indicators which only sometimes coincide with the suspension of the market, may have low accuracy. Indicators with a low accuracy may be able to cause the suspension of the market if they occur simultaneously with other low accuracy indicators. Accuracy may be used by the market suspension module 124 to take a weighted average of the confidence interval of each market suspension indicator. This total confidence interval may then be used to determine if the market should be suspended. The market suspension database 128 may contain a plain text description of the market suspension indicator, for example, "identified by detected movement from the pitcher's mound sensor data."

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for suspending a wager market, comprising:

receiving and storing one or more wagers in a database, the wagers having been placed on an action in a live event;

receiving and storing data collected by at least one sensor associated with the live event;

identifying a plurality of market suspension indicators;

evaluating each market suspension indicator of the plurality of market suspension indicators for accuracy;

storing the plurality of market suspension indicators in a market suspension database, wherein each market suspension indicator is stored with a respective accuracy evaluation;

comparing the data collected by the at least one sensor with the market suspension database;

determining a confidence interval for each market suspension indicator based on both the respective accuracy evaluation and a correlation of the collected data from the at least one sensor; and suspending a wager market after identification of at least one market suspension indicator with a confidence interval that meets or exceeds a predetermined threshold.

2. The method of claim 1, wherein the at least one sensor comprises a camera.

3. The method for suspending a wager market of claim 1, further comprising:

polling the market suspension database for times when the wager market has been suspended;

comparing the times when the wager market has been suspended with the collected sensor data; and determining that the collected sensor data that matched suspensions of the wager market comprises a new market suspension indicator.

4. The method for suspending a wager market of claim 1, further comprising:

calculating a total confidence interval for all identified market suspension indicators.

5. The method for suspending a wager market of claim 4, wherein the total confidence interval is calculated by a weighted average of the identified market suspension indicators and each identified market suspension indicator is weighted based on its respective accuracy evaluation.

6. The method for suspending a wager market of claim 1, further comprising:

reopening the suspended the wager market after the confidence interval falls below the predetermined threshold.

* * * * *